(12) United States Patent
Shimizu

(10) Patent No.: US 8,415,913 B2
(45) Date of Patent: Apr. 9, 2013

(54) CONTROL CIRCUIT AND CONTROL METHOD FOR MOTOR

(75) Inventor: Tatsuro Shimizu, Kyoto (JP)

(73) Assignee: Rohm Co., Ltd. (JP)

( * ) Notice: Subject to any disclaimer, the term of this patent is extended or adjusted under 35 U.S.C. 154(b) by 315 days.

(21) Appl. No.: 12/956,083

(22) Filed: Nov. 30, 2010

(65) Prior Publication Data

US 2011/0292226 A1 Dec. 1, 2011

(30) Foreign Application Priority Data

Nov. 30, 2009 (JP) ................................. 2009-272400

(51) Int. Cl.
*G05B 11/01* (2006.01)
(52) U.S. Cl. ................... 318/560; 318/490; 318/568.16; 318/568.22; 318/617
(58) Field of Classification Search .................. 318/560, 318/568.15, 568.16, 568.22, 615, 616, 617, 318/632, 651, 671, 490
See application file for complete search history.

(56) References Cited

U.S. PATENT DOCUMENTS

| | | | | |
|---|---|---|---|---|
| 6,590,358 B1 * | 7/2003 | Tsutsui | ............... | 318/560 |
| 6,593,719 B2 * | 7/2003 | Satta et al. | ............... | 318/632 |
| 7,190,140 B2 * | 3/2007 | Yoneda | ............... | 318/561 |
| 7,372,231 B2 * | 5/2008 | Sako | ............... | 318/649 |
| 7,564,206 B2 * | 7/2009 | Oomura | ............... | 318/400.26 |

FOREIGN PATENT DOCUMENTS

| | | |
|---|---|---|
| JP | 2003-151231 A | 5/2003 |
| JP | 2005-32406 A | 2/2005 |

* cited by examiner

*Primary Examiner* — Walter Benson
*Assistant Examiner* — Thai Dinh
(74) *Attorney, Agent, or Firm* — Cantor Colburn LLP

(57) ABSTRACT

A control circuit generates a driving signal indicating an actuator torque. A first operation unit generates position, speed, and acceleration signals, based upon a detection signal indicating the actuator mover state. A second operation unit generates a first difference signal indicating the difference between a target signal and the position signal. A third operation unit generates a second difference signal indicating the difference between signals based on the first difference signal and the speed signal. A fourth operation unit generates a position control signal such that the second difference signal becomes zero. A fifth operation unit generates a third difference signal indicating the difference between signals based on a driving signal and the acceleration signal. A sixth operation unit generates a driving signal by summing a signal based on the position control signal and a disturbance estimation signal based on the third difference signal.

19 Claims, 4 Drawing Sheets

CONTROL CIRCUIT AND CONTROL METHOD FOR MOTOR

BACKGROUND OF THE INVENTION

1. Field of the Invention

The present invention relates to a driving technique for driving a motor.

2. Description of the Related Art

Electronic devices having an image acquisition function such as digital still cameras, digital video cameras, camera-mounting cellular phones, etc., have a camera shake correction function. FIGS. 1A and 1B are diagrams showing a configuration of an image acquisition apparatus having a camera shake correction mechanism. Referring to FIG. 1A, an image acquisition apparatus 200 includes an image acquisition sensor 202, a lens 204, a lens holder 206, an actuator (motor) 208, a gyro sensor 214, a Hall effect element 216, and a motor control circuit 218.

The lens 204, which is used to perform camera shake correction, is positioned on an optical axis 220. The lens holder 206, which is used to hold the lens 204, is supported by a shaft 209, which allows the lens holder 206 to be moved in the X-axis direction. FIG. 1B is a perspective view showing a camera shake correction mechanism. The same movable mechanism as that used for the X-axis direction shown in FIG. 1A is also provided for the Y-axis direction. Thus, such an arrangement allows the lens holder 206 to be moved along the XY plane. In order to prevent focusing error due to displacement of the lens in the Z-axis direction, the lens holder 206 is fixed in the Z-axis direction.

The actuator 208 has a configuration including a magnet 210 which is the mover and a pair of coils 212 which is the stator. The mover 210 is provided on the lens holder 206 side, and the coils 212 are provided on a printed-circuit board. Conversely, in some cases, the coils 212 are provided on the lens holder 206 side, and the magnet 210 is provided on the printed-circuit board.

The Hall effect element 216 receives the magnetic field generated by the magnet 210, and generates a Hall signal which indicates the position of the magnet 210, i.e., the position of the mover. The gyro sensor 214 detects vibration of the image acquisition apparatus 200, and generates a gyro signal which indicates the amount of displacement. The control circuit 218 receives the gyro signal and the Hall signal. The control circuit 218 generates a driving signal to be supplied to the coil 212 by performing a feedback operation such that the displacement of the image acquisition apparatus 200 indicated by the gyro signal and the displacement of the lens 204 driven by the actuator 208 cancel each other out. FIG. 1 shows a camera shake correction mechanism configured to correct camera shake in the X-axis direction. Also, the same mechanism is provided for the Y-axis direction. An arrangement may be made in which the image acquisition sensor is moved instead of the lens in order to correct camera shake. In such an arrangement, a camera shake correction mechanism is provided in the same way.

RELATED ART DOCUMENTS

Patent Documents

[Patent Document 1]
Japanese Patent Application Laid Open No. 2003-151231
[Patent Document 2]
Japanese Patent Application Laid Open No. 2005-032406

As described above, in order to prevent deviation of the lens in the Z-axis direction, such an arrangement has a configuration which allows the lens holder 206 to be slid along the shaft 209. Accordingly, the actuator 208 receives external force (drag) due to friction. In particular, the static friction force of the actuator 208 becomes large in the stationary state.

In a case of controlling the position of an object having such large friction, typical arrangements employ a control loop having increased bandwidth. However, such a method leads to problems such as noise occurrence, system instability, etc., due to the increased bandwidth. Such problems are not restricted to the aforementioned camera shake correction mechanism. Rather, such problems can occur in various kinds of actuators (motors).

SUMMARY OF THE INVENTION

The present invention has been made in view of such a situation. Accordingly, it is a general purpose of an embodiment of the present invention to provide a motor driving technique which allows high precision positioning of an object having such large friction.

An embodiment of the present invention relates to a control circuit configured to generate a driving signal which indicates a torque to be generated by a motor based upon a target signal which indicates a target position of a mover of the motor to be driven and a detection signal which indicates any one from among the current position, speed, and acceleration of the mover of the motor. The control circuit comprises: a first operation unit configured to generate, based upon the detection signal, a position signal which indicates the position of the mover, a speed signal which indicates the speed of the mover, and an acceleration signal which indicates the acceleration of the mover; a second operation unit configured to generate a first difference signal which indicates the difference between the target signal and the position signal; a third operation unit configured to generate a second difference signal which indicates the difference between a signal that corresponds to the first difference signal and a signal that corresponds to the speed signal; a fourth operation unit configured to generate a position control signal in order to cause the second difference signal to become zero; a fifth operation unit configured to generate a third difference signal which indicates the difference between a signal that corresponds to the driving signal and a signal that corresponds to the acceleration signal; and a sixth operation unit configured to sum a signal that corresponds to the position control signal and a disturbance estimation signal that corresponds to the third difference signal, thereby generating the driving signal.

With such an embodiment, by generating a disturbance estimation signal which indicates an estimated value of an external force due to friction, etc., and by summing the disturbance estimation signal thus generated and a driving signal so as to perform a feedback control operation for canceling out the external force together with a conventional alignment feedback control operation (PI compensation), such an arrangement provides a high-precision and high-speed positioning control operation. It should be noted that the terms "actuator" and "motor" as used in the present specification will be used without distinguishing between them in particular.

Also, a control circuit according to an embodiment may further comprise a seventh operation unit configured to generate the disturbance estimation signal by performing filtering of the third difference signal.

Also, with an embodiment, the detection signal may represent the current position of the mover of the motor. Also, the first operation unit may comprise: a first differentiator configured to differentiate the position signal so as to generate a speed signal which represents the speed of the mover; and a second differentiator configured to differentiate the speed signal so as to generate an acceleration signal which represents the acceleration of the mover.

Also, the fourth operation unit may generate a position control signal by summing a signal that corresponds to the second difference signal and an integral signal that corresponds to an integrated value of the second difference signal. Alternatively, a signal that corresponds to the second difference signal without the addition of such an integral signal may be used as the position control signal.

Also, the motor may be a motor configured to perform positioning of a lens used in a camera shake correction operation. Also, the control circuit may further comprise an eighth operation unit configured to receive an input signal from a displacement sensor configured to detect the displacement speed of a device mounting the lens, and to integrate the input signal so as to generate the target signal.

Another embodiment of the present invention relates to an electronic device having an image acquisition function. The electronic device having an image acquisition function comprises: an image acquisition sensor; a camera shake correction lens arranged on an incident optical path to the image acquisition sensor; an actuator configured to move the position of the lens; a displacement sensor configured to generate an input signal which indicates displacement speed of the electronic device; a Hall effect sensor configured to generate a position signal which indicates the current position of a mover of the actuator; a control circuit according to any one of the aforementioned embodiments, configured to receive the input signal and the position signal, and to drive the actuator.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 2:
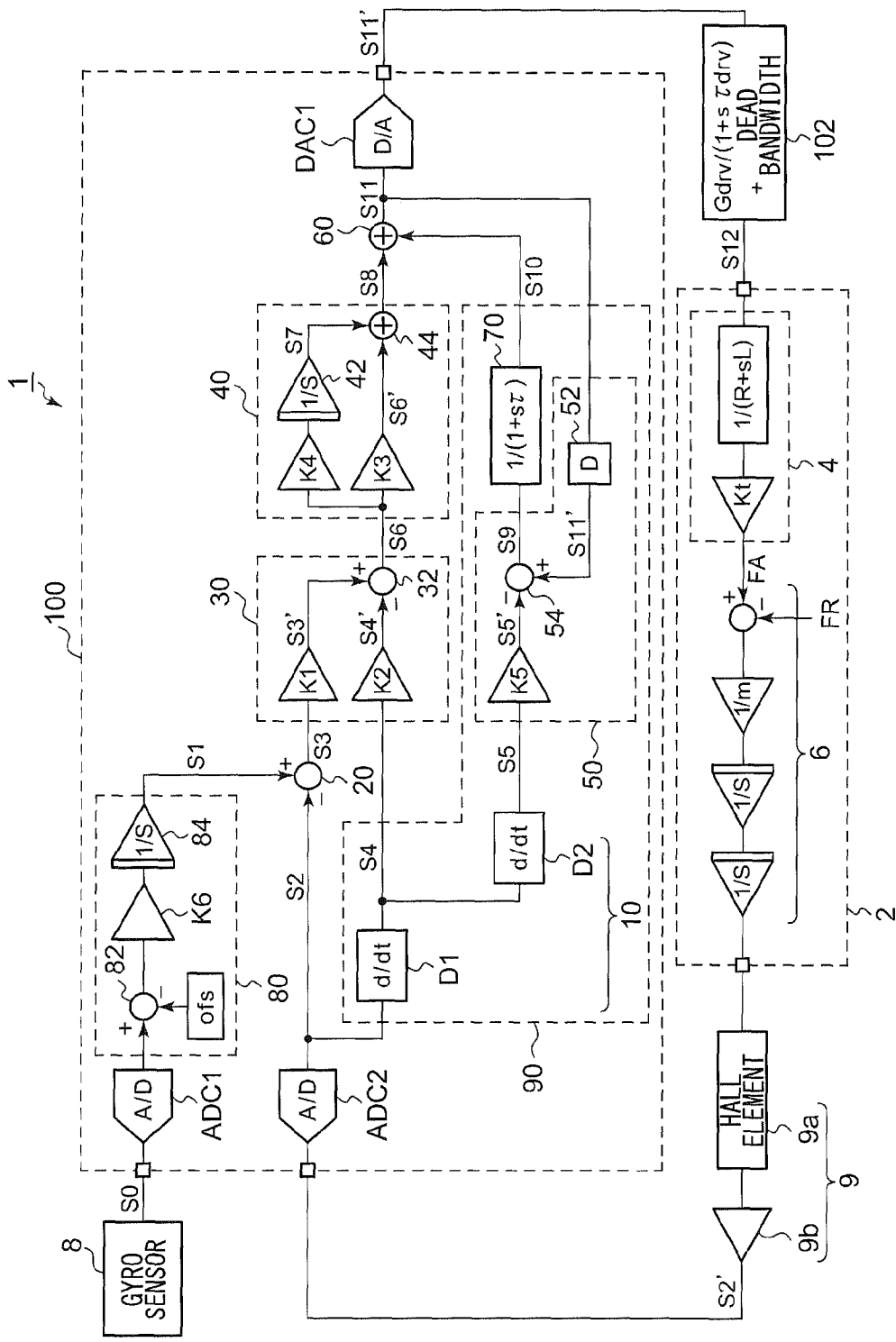
FIG. 2 is a block diagram which shows a configuration of a camera shake correction system according to an embodiment.

FIG. 2 is a block diagram which shows a configuration of a camera shake correction system according to an embodiment. A camera shake correction system 1 is mounted on an electronic device having an image acquisition function such as a digital still camera, digital video camera, camera-mounting cellular phone terminal, etc. The camera shake correction system 1 includes a camera shake correction unit 2, a gyro sensor 8, a Hall effect sensor 9, a control circuit 100, and a driving circuit 102.

The gyro sensor 8 is an angular velocity sensor configured to detect the angular velocity due to vibration of a casing of the electronic device mounting the camera shake correction system 1. Such vibration occurs when the user holds the casing, or when the user presses the shutter button. Alternatively, such vibration occurs due to the operation of the shutter unit in the image acquisition step. The gyro sensor 8 generates a gyro input signal S0 which indicates the angular velocity [rad/sec] of the detected displacement of the casing.

The camera shake correction unit 2 includes a lens and a lens holder (which will simply be referred to as the "lens" hereafter) 6, and an actuator (motor) 4. The Hall effect sensor 9 generates a detection signal S2' which indicates the displacement of the mover of the actuator 4 (i.e., displacement of the lens 6). For example, the Hall effect sensor 9 includes a Hall element 9a and a Hall amplifier 9b.

The control circuit 100 and the driving circuit 102 each drive the actuator 4, and control the position of the lens 6 so as to cancel out the vibration of the camera shake correction system 1 indicated by the gyro input signal S0. Specifically, based upon the gyro input signal S0, the control circuit 100 generates a target signal S1 which indicates the target position for the mover of the actuator 4 to be driven, so as to control the actuator 4 such that the target signal S1 matches the position signal S2 which indicates the current position of the mover.

The above is the overall configuration of the camera shake correction system 1. Next, description will be made regarding the configuration of the control circuit 100. The control circuit 100 generates a driving signal S11 which indicates a torque to be generated by the actuator 4, based upon the target signal S1 which indicates the target position at which the mover is to be positioned and the position signal S2 which indicates the current position of the mover. The control circuit 100 includes A/D converters ADC1 and ADC2, a D/A converter DAC1, and a first operation unit 10 through an eighth operation unit 80.

The first A/D converter ADC1 converts the gyro input signal S0 into a digital signal. In the same way, the second A/D converter ADC2 converts the detection signal S2' into a digital signal.

The eighth operation unit 80 receives the gyro input signal S0 having an angular velocity dimension, and integrates the signal thus received over time, thereby generating the target signal S1 having an angular dimension (amount of displacement). The eighth operation unit 80 includes an offset circuit 82, a sixth coefficient circuit K6, and an integrator 84. The offset circuit 82 is provided in order to cancel out the offset that occurs in the system. The sixth coefficient circuit K6 multiplies a coefficient K6 by the gyro input signal S0 subjected to the offset canceling-out processing. The integrator 84 integrates the input signal over time, thereby generating the target signal S1.

The first operation unit 10 generates, based upon the detection signal S2' received from the Hall sensor 9, a speed signal S4 which indicates the speed of the mover and an acceleration signal S5 which indicates the acceleration of the mover. The first operation unit 10 includes a first differentiator D1 and a second differentiator D2. The first differentiator D1 differentiates the position signal S2 with respect to time, thereby generating the speed signal S4 [m/s] which indicates the speed of the mover. The second differentiator D2 further differentiates the speed signal S4 with respect to time, thereby generating the acceleration signal S5 [m/s2] which indicates the acceleration of the mover. The detection signal S2' is used without change as the position signal S2.

The second operation unit 20 generates a first difference signal S3 which indicates the difference between the target signal S1 and the position signal S2. The control circuit 100 controls the position of the mover of the actuator 4 by performing a position feedback control operation such that the first difference signal S3 becomes zero.

The third operation unit 30 generates a second difference signal S6 which indicates the difference between a signal S3' that corresponds to the first difference signal S3 and a signal S4' that corresponds to the speed signal S4. The signal S3' is a signal obtained by multiplying the first difference signal S3 by a coefficient K1. The signal S4' is a signal obtained by multiplying the speed signal S4 by a coefficient K2. A subtractor 32 subtracts the signal S4' from the signal S3', thereby generating the second difference signal S6.

The fourth operation unit 40 will also be referred to as the "PI compensator", and is configured to generate a position control signal S8 to be used to perform a control operation such that the difference between the first signal S3' and the speed signal S4' becomes zero. Specifically, the fourth operation unit 40 generates the position control signal S8 by summing a signal S6' that corresponds to the second difference signal S6 and an integral signal S7 that corresponds to the integrated value of the second difference signal S6.

Coefficient circuits K3 and K4 multiply the second difference signal S6 by coefficients K3 and K4, respectively. The integrator 42 integrates the output of the fourth coefficient circuit K4 over time. An adder 44 sums the integrated signal S7 received from the integrator 42 and the output signal S6' of the third coefficient circuit K3.

The fifth operation unit 50 generates a third difference signal S9 which indicates the difference between a signal S11' that corresponds to the driving signal S11 and a signal S5' that corresponds to the acceleration signal S5. Specifically, a delay circuit 52 delays the driving signal S11. The delay circuit 52 is provided in order to stabilize the loop provided by the fifth operation unit 50, the seventh operation unit 70, and the sixth operation unit 60. A fifth coefficient circuit K5 multiplies the acceleration signal S5 by a fifth coefficient K5. A subtractor 54 subtracts the output signal S5' of the fifth coefficient circuit K5 from the output signal S11' of the delay circuit 52, thereby generating the third difference signal S9.

The seventh operation unit 70 is configured as a low-pass filter, and generates a disturbance estimation signal S10 based upon the third difference signal S9. The transfer function of the seventh operation unit 70 is represented by the Expression $1/(1+s \cdot \tau)$. Here, $\tau$ represents the time constant of the low-pass filter.

The sixth operation unit 60 sums the position control signal S8 and the disturbance estimation signal S10, thereby generating the driving signal S11. The D/A converter DAC1 converts the driving signal S11 into an analog driving signal S11'.

The above is the configuration of the control circuit 100. The driving circuit 102 drives the camera shake correction unit 2 so as to obtain a torque according to the driving signal S11'. In the present embodiment, the actuator 4 is driven using pulse-width modulation with a duty ratio that corresponds to the value of the driving signal S11. The driving circuit 102 includes an H-bridge circuit. The conduction direction (polarity) of the H-bridge circuit and the ON/OFF duty ratio thereof are each controlled according to the driving signal S11. With such an arrangement, the driving circuit 102 approximately functions as a low-pass filter. The transfer function of the driving circuit 102 is represented by the following Expression (1).

$$G_{drv}/(1+s \cdot \tau_{drv}) + \text{dead-bandwidth} \quad (1)$$

Here, $\tau_{drv}$ represents the time constant of the low-pass dry filter. It should be noted that the driving circuit 102 can be configured using known techniques. The configuration of the driving circuit 102 is not restricted to that of the H-bridge circuit. The effective driving voltage S12 to be supplied to the actuator 4 is obtained via the transfer function of the driving circuit 102.

It should be noted that the driving method of the driving circuit 102 is not restricted to the pulse width modulation driving by such an H-bridge circuit. Also, other driving methods may be employed, such as BTL (Bridged Transless) driving. In such a case, the transfer function of such a driving circuit can be approximated in the same way as in Expression (1).

The transfer function of the actuator 4 is represented by the Expression $Kt \times 1/(R+sL)$.

The term $1/(R+sL)$ represents the impedance of the coil included in the actuator 4. Here, R represents the resistance component of the actuator 4, and L represents the inductance component thereof.

The current [A] that flows through the coil can be calculated by multiplying the driving voltage S12 by the transfer function $1/(R+sL)$. The power [N] generated by the actuator 4 can be calculated by multiplying the current [A] that flows through the coil by a power conversion coefficient Kt[N/A].

Figure 1A:
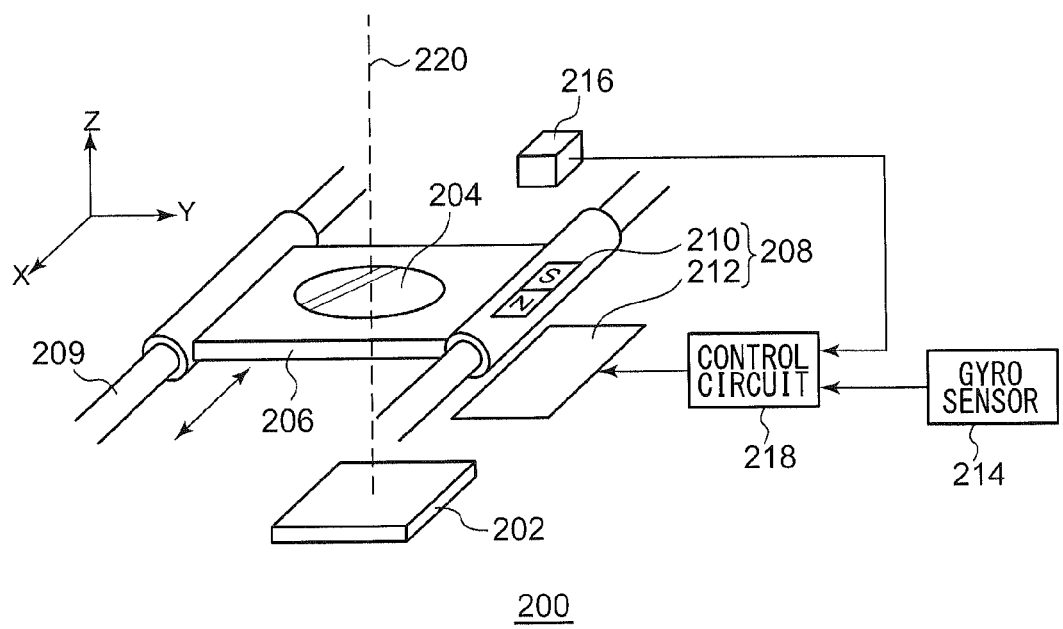
FIGS. 1A and 1B are diagrams showing a configuration of an image acquisition apparatus including a camera shake correction mechanism.
Figure 1B:
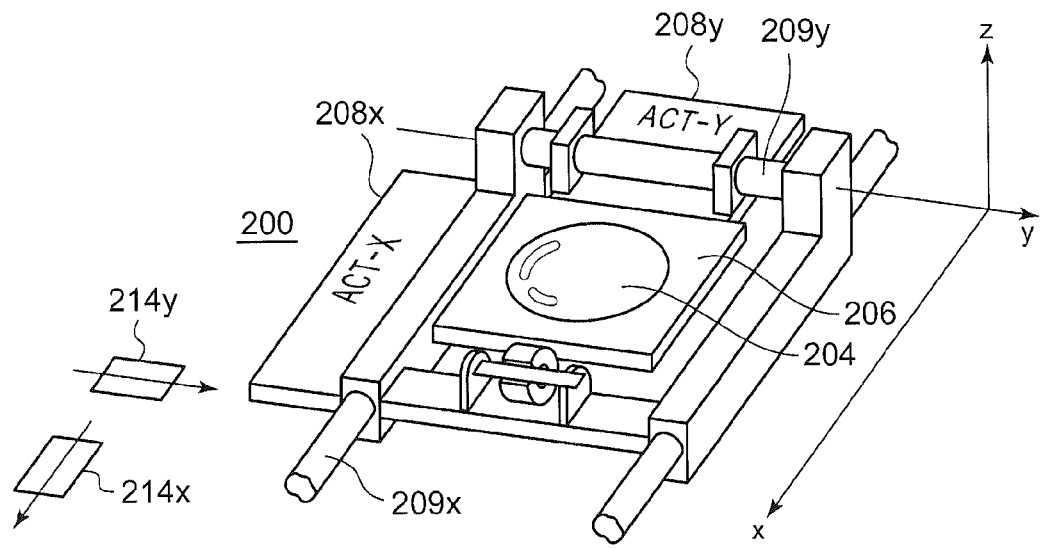

As shown in FIG. 1, in a case in which the lens holder is slid along the shaft, the actuator 4 receives an external force FR[N] due to friction. Accordingly, the mover receives a force obtained by subtracting the frictional force FR from the force FA generated by the actuator 4. With the mass of the lens 6 as m[kg], the acceleration of the lens 6 is represented by the Expression (FA−FR)/m. The speed of the lens 6 is calculated by integrating the acceleration thus calculated over time. Furthermore, by further integrating the speed thus calculated, the position of the lens 6 is calculated. The position of the lens 6 is detected by the aforementioned Hall effect sensor 9, and is fed back to the control circuit 100.

The above is the configuration of the camera shake correction system 1. Next, description will be made regarding the operation thereof. The camera shake correction system 1 shown in FIG. 2 jointly employs the following two feedback operations.

1. A feedback control operation for alignment.
2. A feedback control operation for canceling out an external force by generating a disturbance estimation signal which indicates an estimated value of the external force due to friction etc., and by summing the driving signal and the disturbance estimation signal thus generated.

The alignment feedback control operation is executed by means of a loop mainly provided by the second operation unit 20, the third operation unit 30, the fourth operation unit 40, the driving circuit 102, the camera shake correction unit 2, and the Hall effect sensor 9.

The first differentiator D1, the second differentiator D2, the fifth operation unit 50, and the seventh operation unit 70 form a disturbance estimation unit 90. The disturbance estimation unit 90 estimates the external force due to friction, etc., and generates the disturbance estimation signal S10 which indicates the estimated value thus obtained. Subsequently, the external force is canceled out by superimposing the disturbance estimation signal S10 thus generated onto the position control signal S8 generated by the alignment feedback loop. Thus, such an arrangement provides high-speed and high-precision positioning.

Figure 3:
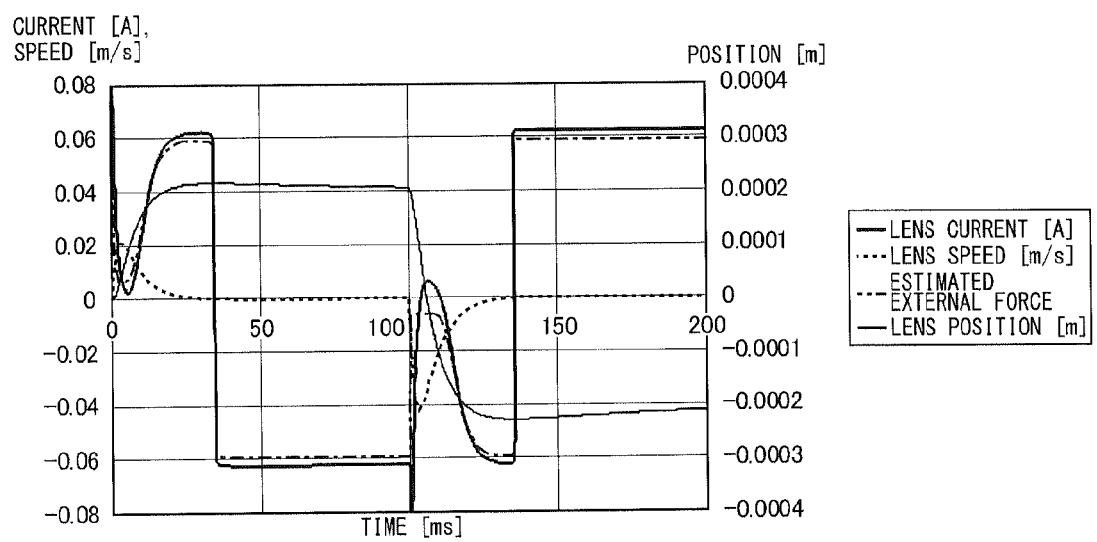
FIG. 3 is a waveform diagram which shows the operation of the camera shake correction system shown in FIG. 2.
Figure 4A:
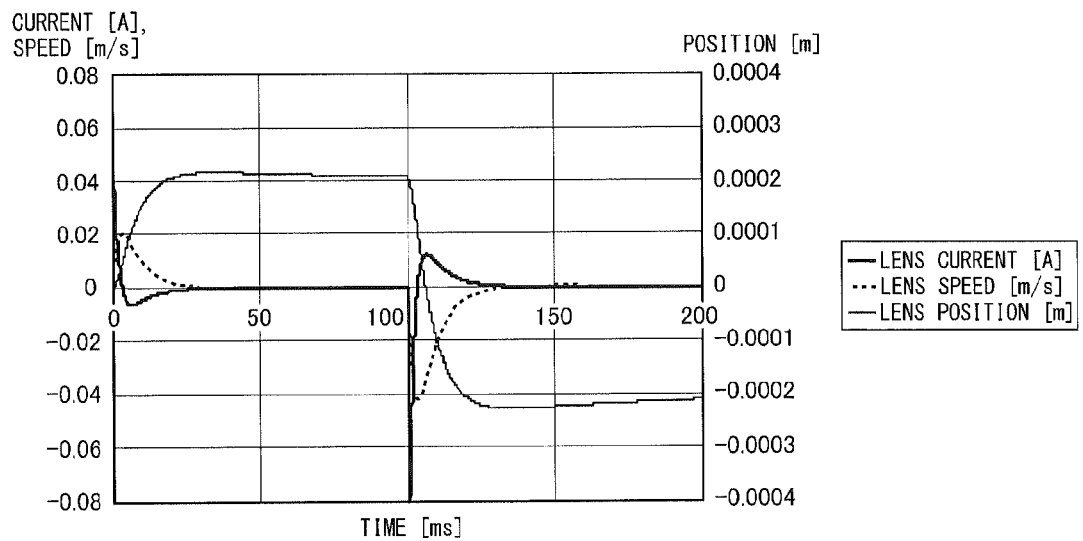
FIGS. 4A and 4B are waveform diagrams showing the operation of a conventional camera shake correction system having no disturbance estimation unit.
Figure 4B:
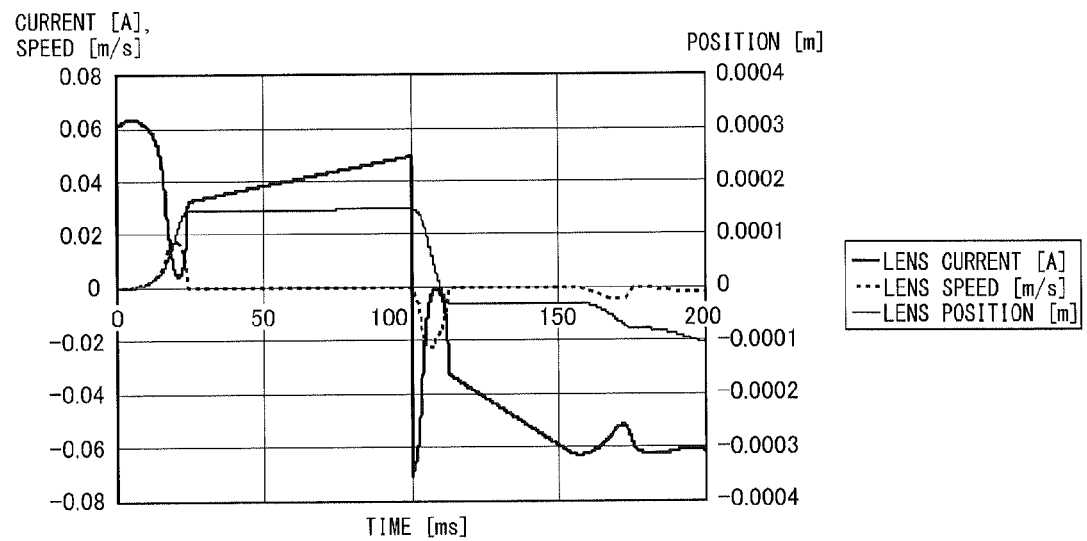

FIG. 3 is a waveform diagram which shows the operation of the camera shake correction system 1 shown in FIG. 2. FIGS. 4A and 4B are waveform diagrams showing the operation of a conventional camera shake correction system that does not have the disturbance estimation unit 90. So that the effects of the present invention will be clearly understood, first, description will be made regarding the operation of a conventional actuator with reference to FIGS. 4A and 4B. In FIGS. 4A and 4B, in the initial state at the time point to, the lens position is 0 [m]. At the time point to, the target position is set to 0.0002 [m]. At the time point t=100 [ms], the target position is set to −0.0002 [m].

FIG. 4A shows an operation in a case in which a very small external force is applied to the mover of the actuator. In this case, alignment of the lens 6 to the target position can be performed by means of the alignment feedback control operation alone. On the other hand, FIG. 43 shows a case in which a large external force (static friction coefficient) is applied to the lens 6. In this case, the lens 6 cannot be controlled by means of the PI compensation alone. As a result, the position of the lens greatly deviates from the target position.

Next, referring to FIG. 3, the camera shake correction system 1 shown in FIG. 2 is capable of estimating the external force, as indicated by the line of dashes and dots, by means of the disturbance estimation unit 90. By generating the driving signal S11 by means of the sixth operation unit 60 so as to cannel out the external force thus estimated, and by driving the actuator 4 according to the driving signal S11, such an arrangement provides high-precision and high-speed positioning of the lens 6.

Description has been made regarding an arrangement according to the present invention with reference to the embodiment. The above-described embodiments have been described for exemplary purposes only, and are by no means intended to be interpreted restrictively. Rather, various modifications may be made with respect to the aforementioned components, processes, and combinations thereof. Description will be made below regarding such modifications.

Description has been made in the embodiment regarding an arrangement configured to receive the gyro input signal S0 having a speed dimension from the gyro sensor 8. However, the present invention is not restricted to such an arrangement. For example, an arrangement may be made configured to receive an input signal having a position dimension using a different sensor. In this case, the integrator 84 included in the eighth operation unit 80 can be eliminated.

Description has been made in the embodiment regarding an arrangement configured to receive the position signal S2 having a position dimension from the Hall effect sensor 9. However, the present invention is not restricted to such an arrangement. For example, an arrangement may be made configured to receive a speed signal having a speed dimension from the Hall effect sensor. With such an arrangement, the position signal S2 can be generated by integrating the speed signal. Thus, such an arrangement does not require the differentiation processing by means of the first differentiator D1. Alternatively, an arrangement may be made configured to receive a speed signal having a speed dimension and a position signal having a position dimension in parallel from two Hall effect sensors. That is to say, the first operation unit 10 should be configured to receive a detection signal that indicates any one of the position, speed, or acceleration of the mover of the actuator 4, and to generate a position signal, a speed signal, and an acceleration signal by differentiating or integrating the detection signal.

Description has been made in the embodiment regarding the camera shake correction system 1. However, the application of the control circuit 100 is not restricted to such an arrangement. Rather, the control circuit 100 can be employed to perform various kinds of position control operations. Also, the device to be controlled is not restricted to such a linear actuator shown in FIG. 1. Rather, the control circuit 100 can be applied to various kinds of motors and actuators.

Also, the layout of the coefficient circuits is not restricted to that shown in FIG. 2. Rather, various changes in the layout can be made, which are readily conceived by those skilled in this art.

While the preferred embodiments of the present invention have been described using specific terms, such description is for illustrative purposes only, and it is to be understood that changes and variations may be made without departing from the spirit or scope of the appended claims.

What is claimed is:

1. A control circuit configured to generate a driving signal which indicates a torque to be generated by a motor based upon a target signal which indicates a target position of a mover of the motor to be driven and a detection signal which indicates any one from among the current position, speed, and acceleration of the mover of the motor, the control circuit comprising:

a first operation unit configured to generate, based upon the detection signal, a position signal which indicates the position of the mover, a speed signal which indicates the speed of the mover, and an acceleration signal which indicates the acceleration of the mover;

a second operation unit configured to generate a first difference signal which indicates the difference between the target signal and the position signal;

a third operation unit configured to generate a second difference signal which indicates the difference between a signal that corresponds to the first difference signal and a signal that corresponds to the speed signal;

a fourth operation unit configured to generate a position control signal in order to cause the second difference signal to become zero;

a fifth operation unit configured to generate a third difference signal which indicates the difference between a signal that corresponds to the driving signal and a signal that corresponds to the acceleration signal; and a sixth operation unit configured to sum a signal that corresponds to the position control signal and a disturbance estimation signal that corresponds to the third difference signal, thereby generating the driving signal.

2. A control circuit according to claim 1, further comprising a seventh operation unit configured to generate the disturbance estimation signal by performing filtering of the third difference signal.

3. A control circuit according to claim 2, wherein, with the time constant of the low-pass filter as τ, a transfer function of the seventh operation unit is represented by the Expression 1/(1+s·τ).

4. A control circuit according to claim 2, wherein the motor is configured to perform positioning of a lens used in a camera shake correction operation,
and wherein the control circuit further comprises an eighth operation unit configured to receive an input signal from a displacement sensor configured to detect the displacement speed of a device mounting the lens, and to integrate the input signal so as to generate the target signal.

5. A control circuit according to claim 4, wherein the eighth operation unit comprises:
an offset circuit configured to apply an offset to an input signal received from the displacement sensor;
a sixth coefficient circuit configured to multiply the output of the offset circuit by a sixth coefficient; and
an integrator configured to integrate the output of the sixth coefficient circuit over time.

6. An electronic device having an image acquisition function, comprising:
an image acquisition sensor;
a camera shake correction lens arranged on an incident optical path to the image acquisition sensor;
an actuator configured to move the position of the lens;
a displacement sensor configured to generate an input signal which indicates displacement of the electronic device;
a Hall effect sensor configured to generate a position signal which indicates the position of a mover of the actuator;
a control circuit according to claim 4, configured to receive the input signal and the position signal, and to generate the driving signal; and
a driving circuit configured to drive the actuator according to the driving signal.

7. An electronic device according to claim 6, configured to perform a feedback control operation for aligning the lens.

8. An electronic device according to claim 7, wherein the feedback control operation for aligning the lens is executed by means of a loop provided by: the second operation unit, the third operation unit, and the fourth operation unit of the control circuit; the driving circuit; the correction lens and the actuator; and the Hall effect sensor.

9. An electronic device according to claim 8, wherein the first operation unit, the fifth operation unit, and the seventh operation unit form a disturbance estimation unit configured estimate an external force due to friction etc., and to generate a disturbance estimation signal which indicates an estimated value of the external force,
and wherein the external force is canceled out by superimposition of the disturbance estimation signal onto the position control signal generated by the alignment feedback loop.

10. A control circuit according to claim 1, wherein the detection signal represents the current position of the mover of the motor,
and wherein the first operation unit comprises:
a first differentiator configured to differentiate the position signal so as to generate a speed signal which represents the speed of the mover; and
a second differentiator configured to differentiate the speed signal so as to generate an acceleration signal which represents the acceleration of the mover.

11. A control circuit according to claim 1, wherein the third operation unit comprises:
a first coefficient circuit configured to multiply the first difference signal by a first coefficient;
a second coefficient circuit configured to multiply the speed signal by a second coefficient; and
a subtractor configured to subtract the output of the second coefficient circuit from the output of the first coefficient circuit.

12. A control circuit according to claim 1, wherein the fourth operation unit is configured to generate the position control signal by summing a signal that corresponds to the second difference signal and an integral signal that corresponds to the integrated value of the second difference signal.

13. A control circuit according to claim 1, wherein the fourth operation unit comprises:
a third coefficient circuit configured to multiply the second difference signal by a third coefficient;
a fourth coefficient circuit configured to multiply the second difference signal by a fourth coefficient;
an integrator configured to integrate the output of the fourth coefficient circuit over time; and;
an adder configured to sum the output of the third coefficient circuit and the integrator.

14. A control circuit according to claim 1, wherein the fifth operation unit comprises:
a delay circuit configured to delay the driving signal;
a fifth coefficient circuit configured to multiply the acceleration signal by a fifth coefficient; and
a subtractor configured to subtract the output of the fifth coefficient circuit from the output of the delay circuit.

15. A method for generating a driving signal which indicates a torque to be generated by a motor based upon a target signal which indicates a target position of a mover of the motor to be driven and a detection signal which indicates any one from among the current position, speed, and acceleration of the mover of the motor, the method comprising:
generating a position signal which indicates the position of the mover, a speed signal which indicates the speed of the mover, and an acceleration signal which indicates the acceleration of the mover, by integrating or differentiating the detection signal;
generating a first difference signal which indicates the difference between the target signal and the position signal;
generating a second difference signal which indicates the difference between a signal that corresponds to the first difference and a signal that corresponds to the speed signal;
generating a position control signal in order to cause the second difference signal to become zero;
generating a third difference signal which indicates the difference between a signal that corresponds to the driving signal and a signal that corresponds to the acceleration signal; and
generating the driving signal by summing a signal that corresponds to the position control signal and a signal that corresponds to the third difference signal.

16. A method according to claim 15, further comprising generating the disturbance estimation signal by performing filtering of the third difference signal.

17. A method according to claim 15, wherein the detection signal represents the current position of the mover of the motor, and wherein the generation of the acceleration signal comprises:
differentiating the position signal so as to generate a speed signal which represents the speed of the mover; and
differentiating the speed signal so as to generate an acceleration signal which represents the acceleration of the mover.

18. A control circuit according to claim 15, wherein the generation of the second difference signal comprises:
multiplying the first difference signal by a first coefficient;
multiplying the speed signal by a second coefficient; and
subtracting the speed signal thus multiplied by the second coefficient, from the first difference signal thus multiplied by the first coefficient.

19. A method according to claim 15, wherein, in the generation of the position control signal, the position control signal is generated by summing a signal that corresponds to the second difference signal and an integral signal that corresponds to the integrated value of the second difference signal.

* * * * *